Patented Nov. 7, 1922.

1,434,429

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

PROCESS OF MANUFACTURING CERTAIN ACETYL-METHYL AMINES.

No Drawing.   Application filed August 23, 1921.   Serial No. 494,711.

*To all whom it may concern:*

Be it known that I, HANS T. CLARKE, a subject of the King of Great Britain, residing at Rochester, in the county of Monroe and State of New York, have invented certain new and useful Improvements in Processes of Manufacturing Certain Acetyl-Methyl Amines, of which the following is a full, clear, and exact specification.

This invention relates to a process of making acyl derivatives of monomethyl aminophenols and their esters. More specifically it is an application of the generic process described and broadly claimed in the application of myself and William W. Hartman, Serial No. 435,973, filed Jan. 8, 1921. I have discovered that the process there defined is especially applicable to the dimethylamino derivatives of aromatic radicals containing oxygen as a substituent; and I will give a particularly useful illustration of this application.

Dimethyl paraminophenol is a by-product obtained in the processes for the preparation of monomethyl paraminophenol by direct methylation and has hitherto been of little value. By the process herein described it is possible to utilize it in the preparation of monomethyl paraminophenol sulfate.

The dimethyl paraminophenol base obtained as a by-product is converted by known means into dimethyl paraminophenyl acetate. For instance, there is added to it a sufficient quantity of acetic anhydride and with moderate warming it is converted at once into the acetate. This product is a stable white solid, very soluble in benzene, melting at 78° C., and boiling without decomposition at 160–164° C., under 12 mm. pressure.

This is heated at atmospheric pressure to a temperature of about 190° C., at which it is maintained, and acetyl chloride is added at a rate sufficiently slow to prevent the temperature of the mixture falling below a critical temperature of 160° C., this being above the temperature at which an equimolecular mixture of the ingredients would boil. This evolves methyl chloride and produces acetyl-methyl paraminophenyl acetate.

While the reaction starts at about 160° C., the velocity of the reaction becomes much more convenient in the neighborhood of 190° C.; and in the preferred embodiment of my invention the mixture is maintained at substantially this temperature, although the useful range in that neighborhood may extend down to 180° C., at least.

The heated bath may be composed of dimethyl paraminophenyl acetate or a mixture of this substance and acetyl-methyl paraminophenyl acetate. To either of these baths acetyl chloride or a mixture (preferably equimolecular) of dimethyl aminophenyl acetate and acetyl chloride may be added, a small amount at a time, intermittently, or in a small continuous stream, at such a rate that the temperature does not fall much below 190° C. When an equimolecular mixture of acetyl chloride and dimethyl aminophenyl acetate is added to the bath, the latter may be composed almost entirely of acetyl-methyl aminophenyl acetate, but this is not the preferred form. It is preferable to add the acetyl chloride or the mixture under the surface of the bath, any of the well known means for making such addition being useful for this purpose. Methyl chloride is evolved in the reaction, and may be recovered.

The bath is cooled and the resulting dark colored mass, consisting almost entirely of acetyl-methyl paraminophenyl acetate, is distilled under reduced pressure, when it passes over at about 196° C., at 12 mm. pressure and condenses to a colorless solid melting at 97° C. Any unchanged dimethyl paraminophenyl acetate present can be removed by treatment with benzene, in which the diacetyl compound is almost insoluble in the cold.

On treatment with dilute sulfuric acid in the cold, the acetyl group attached to the oxygen atom of the acetyl-methyl paraminophenyl acetate is split off as acetic acid, leaving the sparingly soluble acetyl-methyl paraminophenol. This last compound on boiling with dilute sulfuric acid again loses acetic acid being quantitatively converted into monomethyl paraminophenol sulfate.

Having thus described my invention, what I claim as new and desire to secure by Letters Patent is:

1. The process of making acetyl monomethylamino derivatives of aromatic radicals containing oxygen as a substituent, which comprises reacting on a corresponding dimethylamino compound with acetyl chloride at a temperature above the temperature at which an equimolecular mixture of said ingredients would boil.

2. The process of making acetyl-monomethyl aminophenyl acetate, which comprises reacting on dimethyl aminophenyl acetate with acetyl chloride at a temperature above 160° C.

3. The process of making acetyl-monomethyl aminophenyl acetate which comprises reacting on dimethyl aminophenyl acetate with acetyl chloride at a temperature in the neighborhood of 190° C.

4. The process of making acetyl-monomethyl aminophenyl acetate, which comprises adding acetyl chloride to a heated bath containing dimethyl aminophenyl acetate at such a rate that the temperature thereof does not fall below 160° C.

5. The process of making an acetyl monomethylamino derivative of an aromatic radical containing oxygen as a substituent which comprises adding acetyl chloride to a heated bath containing a corresponding dimethylamino compound at such a rate that the temperature of the bath does not fall below a reaction temperature above the temperature at which an equimolecular mixture of such ingredients boil.

6. The process of making acetyl-monomethyl aminophenyl acetate, which comprises adding acetyl chloride below the surface of a heated bath containing dimethyl aminophenyl acetate while maintaining the temperature of said bath at approximately 190° C.

7. The process of making an acetyl-methyl aminophenyl acetate, which comprises adding a mixture of acetyl chloride and dimethyl aminophenyl acetate to a bath which is maintained at a temperature above 160° C.

8. The process of making acetyl-methyl aminophenyl acetate, which comprises adding an equimolecular mixture of acetyl chloride with dimethyl aminophenyl acetate to a heated bath containing the two said aminophenyl compounds.

9. The method of utilizing dimethyl aminophenol, which comprises the conversion thereof into dimethyl aminophenyl acetate, and then causing the latter to react with acetyl chloride to produce acetyl-methyl aminophenyl acetate.

10. The method of utilizing dimethyl aminophenol, which comprises the conversion thereof into dimethyl aminophenyl acetate, and then causing the latter to react with acetyl chloride to produce acetyl-methyl aminophenyl acetate, and then converting this substance into monomethyl paraminophenol.

Signed at Rochester, New York, this 18th day of August, 1921.

HANS T. CLARKE.